US008683068B2

(12) United States Patent
Jalili et al.

(10) Patent No.: US 8,683,068 B2
(45) Date of Patent: Mar. 25, 2014

(54) INTERACTIVE DATA STREAM

(75) Inventors: Reza Jalili, Sandy, UT (US); Gregory J. Clary, Cary, UT (US)

(73) Assignee: Gregory J. Clary, Cary, NC (US)

( * ) Notice: Subject to any disclaimer, the term of this patent is extended or adjusted under 35 U.S.C. 154(b) by 897 days.

(21) Appl. No.: 12/190,581

(22) Filed: Aug. 12, 2008

(65) Prior Publication Data

US 2009/0182891 A1 Jul. 16, 2009

Related U.S. Application Data

(60) Provisional application No. 60/955,387, filed on Aug. 13, 2007.

(51) Int. Cl.
*G06F 15/16* (2006.01)
*H04L 12/40* (2006.01)
*H04L 29/06* (2006.01)
*G06F 17/30* (2006.01)

(52) U.S. Cl.
CPC .... *H04L 12/40117* (2013.01); *H04L 29/06476* (2013.01); *H04L 65/60* (2013.01); *G06F 17/30867* (2013.01)
USPC .......................................... 709/231; 709/217

(58) Field of Classification Search
CPC .................. G04F 17/30056; G04F 17/30867; G06Q 30/02; H04L 12/40117; H04L 29/06475; H04L 65/4092; H04L 65/60; H04L 65/602
USPC .................... 709/231, 217; 705/14.49; 725/61
See application file for complete search history.

(56) References Cited

U.S. PATENT DOCUMENTS

| | | |
|---|---|---|
| 7,003,515 B1 * | 2/2006 | Glaser et al. ....................... 707/5 |
| 7,237,252 B2 | 6/2007 | Billmaier |
| 7,266,835 B2 | 9/2007 | Halbert |
| 7,577,979 B2 | 8/2009 | Feinleib et al. |
| 7,580,702 B2 | 8/2009 | Othmer |
| 7,774,815 B1 | 8/2010 | Allen |
| 2003/0167467 A1 | 9/2003 | Allen et al. |
| 2003/0208613 A1 * | 11/2003 | Signes et al. ................... 709/231 |
| 2003/0226152 A1 | 12/2003 | Billmaier et al. |
| 2004/0003402 A1 | 1/2004 | McKenna |
| 2004/0003406 A1 | 1/2004 | Billmaier |
| 2004/0003412 A1 | 1/2004 | Halbert |
| 2004/0031052 A1 | 2/2004 | Wannamaker et al. |
| 2004/0031061 A1 | 2/2004 | McCalla et al. |
| 2004/0078814 A1 | 4/2004 | Allen |
| 2005/0028195 A1 | 2/2005 | Feinleib et al. |
| 2005/0039135 A1 | 2/2005 | Othmer et al. |
| 2005/0166257 A1 | 7/2005 | Feinleib et al. |
| 2005/0210391 A1 | 9/2005 | Othmer |
| 2006/0206478 A1 * | 9/2006 | Glaser et al. ....................... 707/5 |
| 2006/0212442 A1 * | 9/2006 | Conrad et al. ..................... 707/5 |
| 2006/0259613 A1 | 11/2006 | Othmer |
| 2006/0282852 A1 | 12/2006 | Purpura et al. |
| 2007/0038567 A1 * | 2/2007 | Allaire et al. ................... 705/50 |
| 2010/0023871 A1 | 1/2010 | Bederson et al. |

* cited by examiner

*Primary Examiner* — Brian J Gillis
(74) *Attorney, Agent, or Firm* — Smith Moore Leatherwood LLP

(57) ABSTRACT

The present invention is geared generally towards the transmission of data, such as images, audio, video, or text, as a continuous stream via a network to recipients. In particular, the present invention relates to enabling the transmission of data to recipients and enabling the recipients to interact and influence the content of the transmission.

35 Claims, 4 Drawing Sheets

INTERACTIVE DATA STREAM

CROSS-REFERENCE TO RELATED APPLICATIONS

The present application claims priority from U.S. Provisional Patent Application Ser. No. 60/955,387, entitled: Interactive Data Stream filed on Aug. 13, 2007, the contents of which are incorporated herein by reference.

TECHNICAL FIELD

The present invention is geared generally towards the transmission of data, such as images, audio, video, or text, as a continuous stream via a network to recipients. In particular, the present invention relates to enabling the transmission of data to recipients and enabling the recipients to interact and influence the content of the transmission.

BACKGROUND

Various systems and services transmit entertaining, informative, and advertising content to recipients in a continuous broadcast. The most common of these are television and radio broadcasts. More recently, services have begun providing similar content to recipients via other mediums, such as via networks associated with personal computers and mobile devices. For example, many Internet services provide video streams. Some of these services, such as CNN.com, provide users with content similar to that found in television broadcasts. For example, such services may provide access to pre-recorded video news reports or live (or near-to live) broadcasts of sporting events. However, apart from the user selecting which video to watch, these sites do not involve user interaction. More user-driven services, such as YouTube.com, typically acquire the content they broadcast from user video file uploads. Although users can rate such clips, they can do little else to interact with the transmission. Apart from the content broadcasted, these user-driven services do not vary much from the aforementioned traditional sites.

Regarding audio transmissions, in addition to traditional radio, individuals have access to a variety of radio programs broadcasted over the Internet as well. Internet radio stations often allow listeners to influence the broadcast by requesting songs, such as by selecting a song from a song library and thereby placing the song into the station's queue. Other Internet radio stations, such as Pandora.com, allow users to generate their own personal broadcast by indicating favorite songs or musicians. The service may then create a broadcast based upon characteristics the service has associated with the song or musician, and thereby attempt to play music that the listener may enjoy. In addition to listening to these stations themselves, users can share their personal stations with other users. While such services enable greater interaction than video broadcasts, the interaction is typically one-way. For example, a listener, perhaps even a majority of the listeners, may not like a song that has been requested, but, apart from contacting the service administrator, these listeners have no immediate way of preventing the song from being played. Furthermore, although user-specific Internet radio stations may reflect the preferences of the individual listener, they lack the community of other services. For example, unless a Pandora.com user shares his station, he is the only one with access to it. Furthermore, if another Pandora.com user listens to a shared station, what he is really being shared is the song preferences and not the actual broadcast. That is, both users listening to the same shared station may not be listening to the same song.

In addition to the distribution of video and audio files, many services enable users to share images, such as photographs and illustrations. For example, Flickr.com allows users to upload pictures which can then be shared with other users. The photographs can be made public so that any visitor to the site may view them, or one may restrict access to the pictures to particular users. Such sites typically can display images in a data stream by scrolling selected images across the screen or by automatically switching from one picture to the next (often called a "slide show"). However, like the data streaming methods of video and audio, apart from providing a rating, users lack a means of affecting the content.

What is lacking is a convenient and enjoyable medium by which users may not only perceive a data stream transmission, but also may influence the content with their own individual input as the transmission is occurring.

SUMMARY

The present invention addresses the aforementioned needs by enabling an interactive data stream system. By obtaining user input, such as during the transmission of the data stream, a data stream service provider may provide recipients with a transmission of particular relevance or interest to the recipient.

An object of the present invention is to provide a mechanism by which an individual can influence the content of a data stream transmitted to an audience.

Another object of the invention is to provide a mechanism by which an individual can contribute content to a data stream transmitted to an audience by submitting data, such as images, audio, video, or text, to the service distributing the transmission.

Another object of the invention is to provide a mechanism for an interactive data stream that enables recipients to participate in a contest.

Another object of the invention is to provide a mechanism for an individual to indicate his geographic location to the audience of a data stream transmission.

Another object of the invention is to provide a mechanism for members of a data stream audience to interact with one another by way of the service distributing the data stream.

Another object of the invention is to provide a mechanism for an interactive data stream that enables recipients to receive real estate information.

Another object of the invention is to provide a mechanism for an interactive data stream that enables recipients to influence the content of a music broadcast.

Another object of the invention is to provide a mechanism for an interactive data stream that enables recipients to receive relevant travel data.

Another object of the invention is to provide a mechanism for an interactive data stream that enables users to influence advertising data associated with the data stream.

Another object of the invention is to provide a mechanism for a user of an interactive data stream to purchase goods or services associated with the content of the data stream.

Another object of the invention is to provide a mechanism for users of online communities to share content via an interactive data stream, such as, for example, favorite goods or services.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

In order to describe the manner in which the above-recited and other advantages and features of the invention can be obtained, a more particular description of the invention is briefly described. The present invention pertains to a system, computer program product, and methods that enable an individual to perceive a data stream and to interact with it. The concepts of the present invention can be applied to software utilized by a device, such as a program installed on a personal computer or mobile device, such as a mobile phone. However, the invention could also be enabled as a device in itself designed for the concepts set forth herein. The present invention can pertain to both a device particular to the processes described herein and to software methods that may enable any device to do the same.

Figure 1:
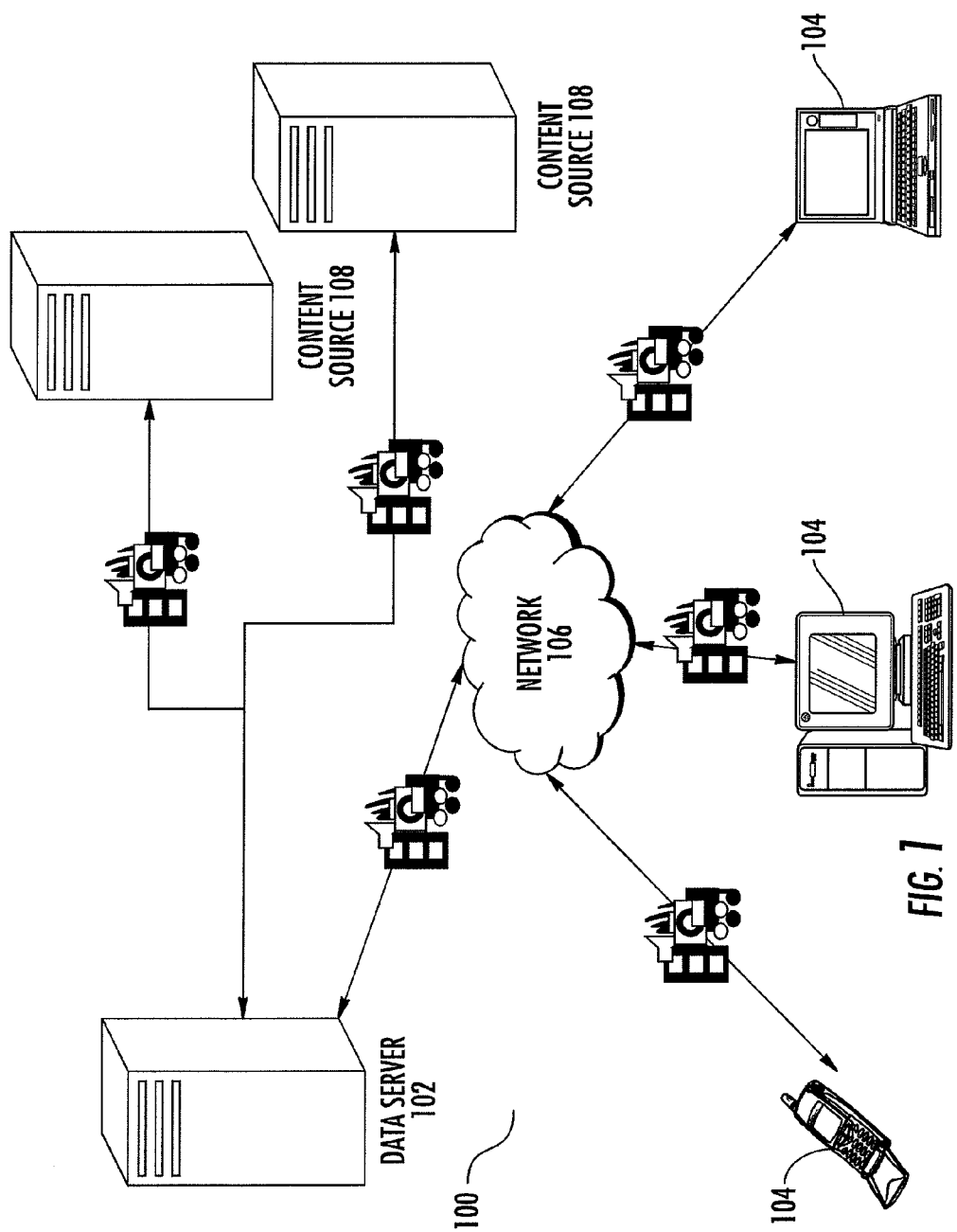
FIG. 1 illustrates a general architecture overview of an embodiment of an interactive data stream transmission system.

FIG. 1 illustrates a general architecture overview of an embodiment of the system of the present invention. The system 100 can include a data server 102 of a service provider connected via a network 106 to one or more devices 104, such as a laptop, a personal computer, or a mobile device (e.g, mobile phone, PDA, etc.). The network 106 may include the Internet, a local area network (LAN), a wide area network (WAN), a telephone network, a mobile device network, or the like. The data server 102 may also be connected to one or more content sources 108. A content source 108 may be any source of content (other than device 104) utilized by the data server 102 for its data stream transmission(s). For example, a content source 108 may be a distributor of audio, video, image, or textual data pertaining to, for example, music, news, real estate information, travel information, product information, or the like. Although FIG. 1 illustrates the connection between the data server 102 and the content sources 108 as separate from the network 106 connecting the data sever 102 to devices 104, this is done for purposes of emphasis and is not to be construed as limiting. The same network 106 may be utilized by all of the various components of the system. Furthermore, it is to be understood that FIG. 1 is for illustrative purposes only and that the system of the present invention could encompass any number of data servers 102, devices 104, and content sources 108. Additionally, the types of devices illustrated are not to be construed as limiting as any device with the capability to receive a data stream may be utilized, whether the device is specifically designed to receive the data stream or is a general purpose device enabled to receive the data stream.

Figure 2:
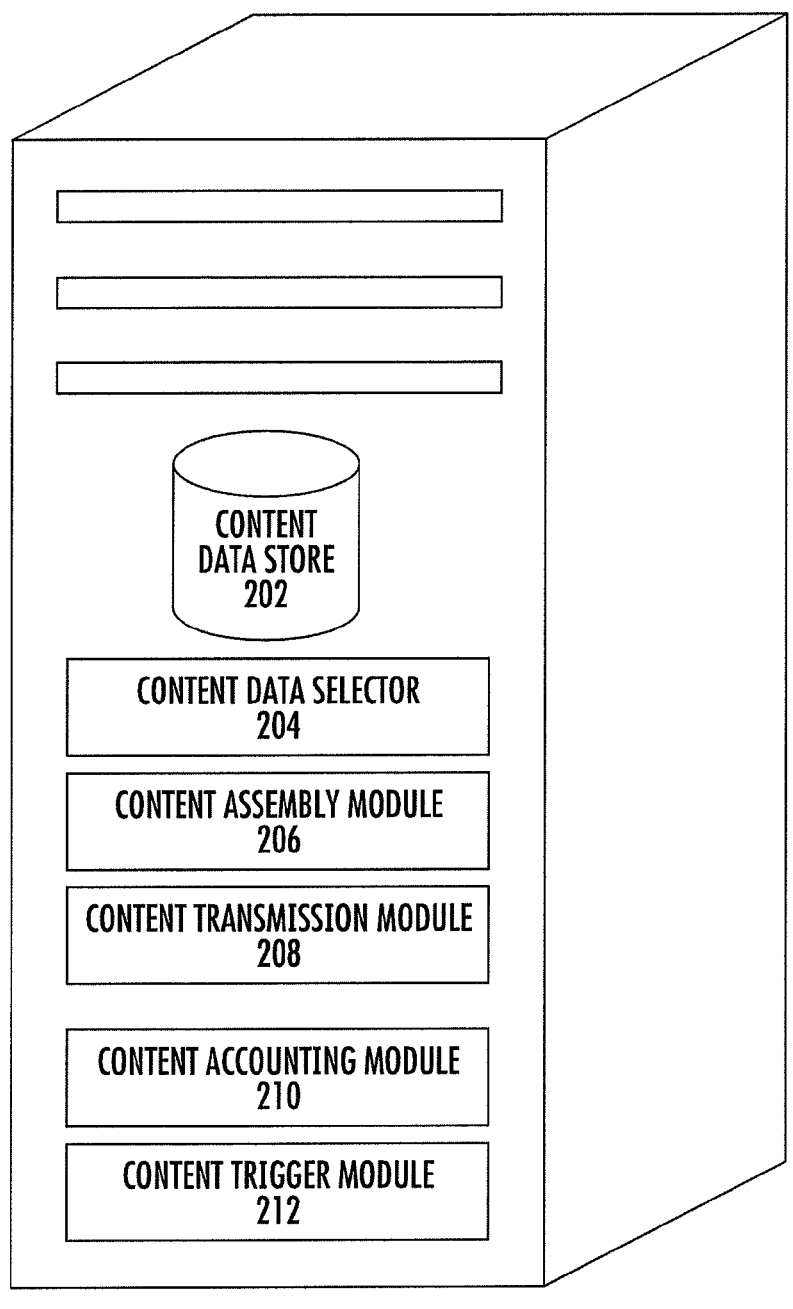
FIG. 2 illustrates an embodiment of a data server of a data stream transmission system.

The data server 102 may include one or more components, as illustrated by FIG. 2. A content data store 202 may store (e.g., in a cache, in long-term storage, or the like) content received from a content source 108 or a device 104. The data server 102 may also include a content data selector 204 which may query content sources 108 for content, determine content to be included in a transmission per established criteria, match content with the appropriate recipient, and the like. A content assembly module 206 may utilize content stored in the content data store 202 and configure it for transmission, including adding control buttons, ads, links, descriptive text, community opinion of the content, or the like. The content transmission module 208 may handle data stream sessions and manage connections to devices 104. A content accounting module 210 may track various statistics, such as amounts of royalty handled, the number of times an element of content was presented (e.g., images or ads shown, songs played, etc.), the number of recipient clicks, or the like. Furthermore, the data server 102 may include a content trigger module 212 that initiates an action when a recipient clicks a content link or control button.

Figure 3:
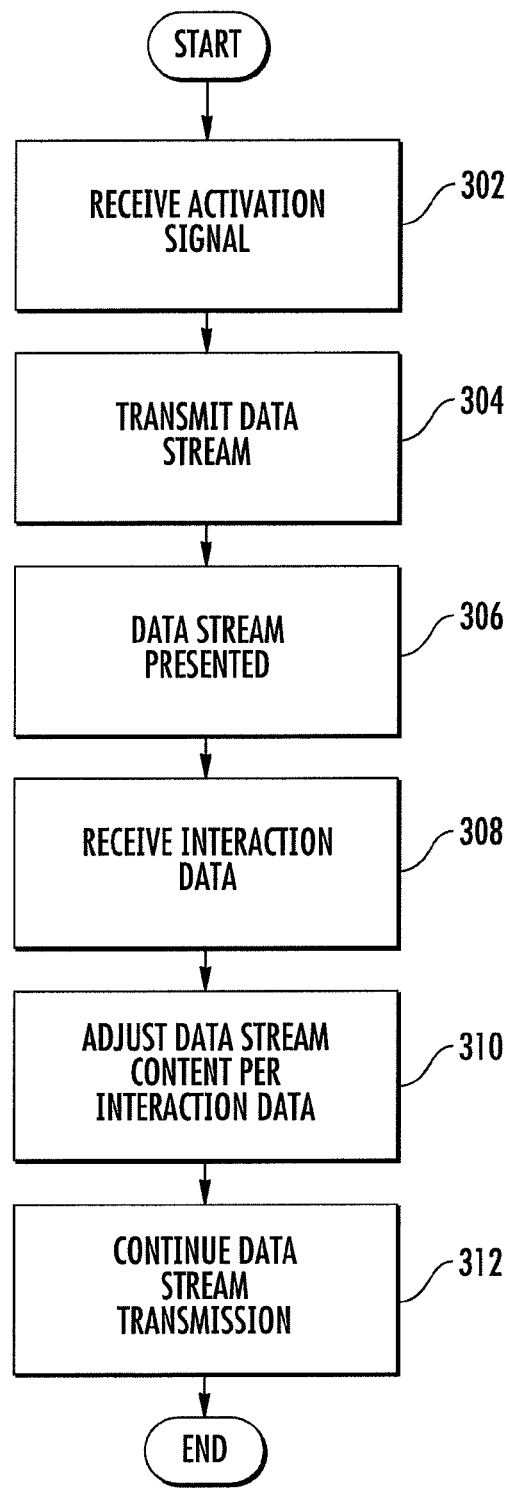
FIG. 3 illustrates a flowchart of an embodiment of a process for adjusting the content of a data stream transmission per recipient interaction.
Figure 4:
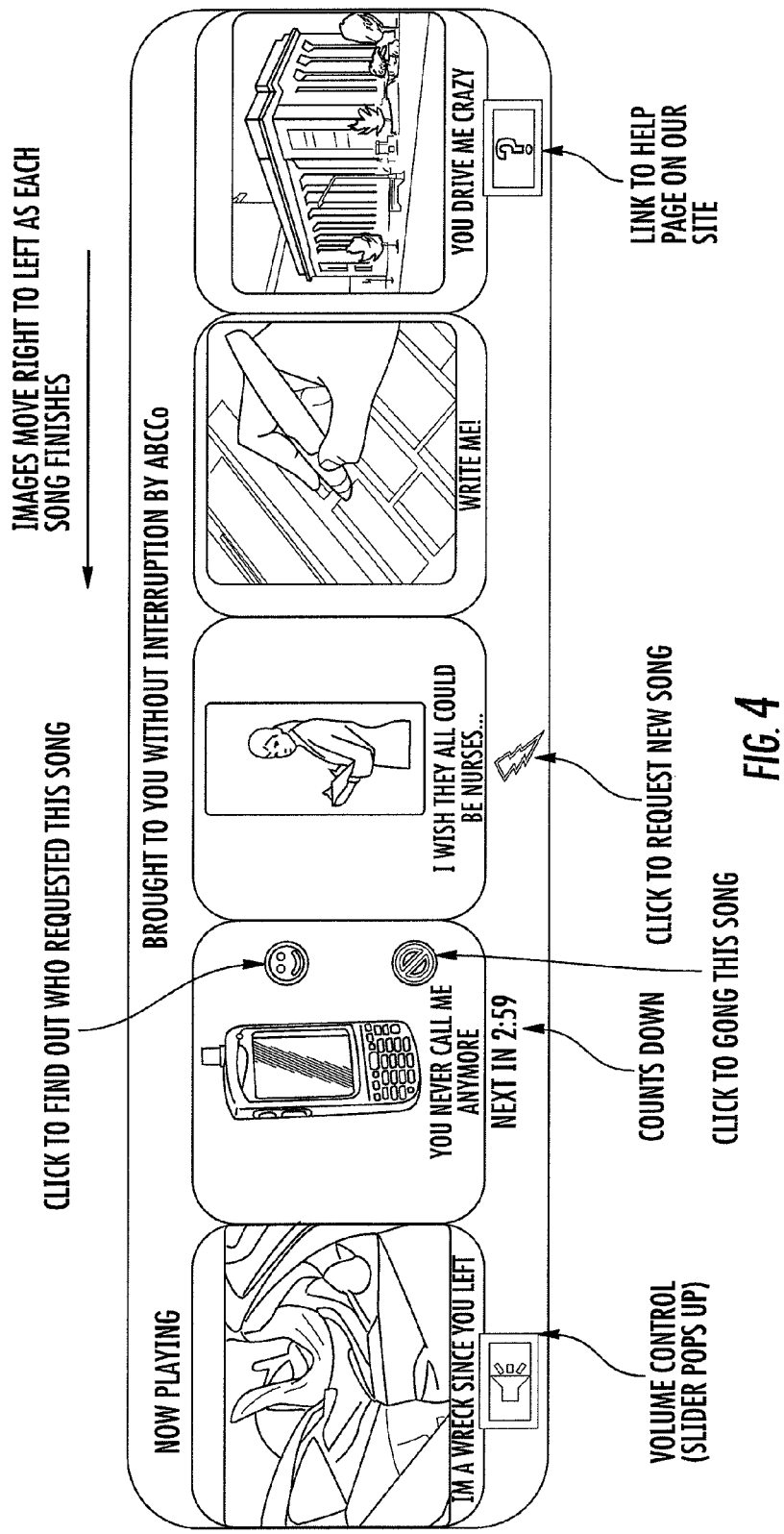
FIG. 4 illustrates an embodiment of an example of the presentation of data stream content.

FIG. 3 illustrates a flowchart of an embodiment of a process for a data server 102 to adjust a data stream transmission per recipient interaction. The data server 102 may initiate a data stream transmission to a device 104 upon receipt of an activation signal sent from the device 104 (step 302). For example, an individual employing his personal computer may activate a desktop utility, such as a Yahoo Widget or a Google Gadget, thereby transmitting a signal to the data server 102. Once the activation signal is received, the data server 102 may transmit a data stream transmission to the device 104 via the network 106 (step 304). Once received, the content of the transmission, such as images, video, text, and/or audio data, may be presented to the recipient via a presentation mechanism of the device 104 (step 306). FIG. 4 illustrates an embodiment of an example of the presentation of data stream content. In regard to audio transmissions, corresponding images or video (e.g., album covers, pictures of musicians, etc.) may be displayed simultaneously with the audio data. The presentation mechanism may display images by scrolling or sliding them across the screen, such as from left to right or up to down. The particular elements of the transmission could be presented only once, or the elements can repeat as a loop and the elements of the loop may change or change position in response to user interaction. A user can concurrently use other services, if any, enabled by his device 104, while the data stream is displayed. Returning to the example of the desktop utility, the user could run other software on his computer simultaneous to the display of the data stream. As another example, if the device 104 is a mobile phone, the data stream could run as the recipient performs other tasks, such as placing and receiving calls. Although a data server 102 may broadcast multiple data stream transmissions, and a device 104 may receive and display more than one data stream, each recipient of a particular stream may receive the same content at the same time or as close as possible per limitations of the technology utilized.

As the recipient watches and/or listens to the content of the data stream, he may participate with the transmission. For example, the recipient may use the mouse of his personal computer to click a presented image. Doing so may initiate an interaction mechanism whereby the user can interact with the transmission. For example, after selecting an image, a dialogue box may appear to provide the recipient with information about the content of the image or the associated audio data, and enable the user to initiate interactions that may influence the data stream transmission. Such information and the details of the particular interactions could be included in the initial data stream transmission or could be sent from the data server 102 once an element of the transmission is selected. Once the recipient selects an interaction, the data server 102 receives an interaction data message regarding the interaction from the device 104 (step 308). For example, the recipient may upload image, video, text, and/or audio data to be included into the data stream. Other examples of manners in which a recipient may interact with the data stream include voting on content, adding tags to content, clicking on content, recommending content to another person (a fellow recipient or an outside party), rating content, vetoing content, selecting content for future use (such as a query for more content or purchase), or by providing a direct link to the digital rights or copyright holder of an element of content (perhaps enabling the recipient to make a royalty payment to use the content). Upon receipt of the interaction data message, the data server 102 may utilize the message to adjust the content of the data stream accordingly (step 310). Preferably, the data server 102 not only changes the content of the data stream transmitted to that particular device 104, but the content of the data stream is changed for all recipients of the particular data stream, thereby ensuring each device 104 receiving the data stream receives the same transmission. Once the data server 102 has adjusted the data stream transmission, it continues sending the transmission to the appropriate devices 104, unless the aforementioned adjustment results in the conclusion of the data stream transmission (step 312).

Having described an overview of the present invention, particular scenarios are described hereinafter. The inclusion of these descriptions is not to be construed as limiting and it will be appreciated by those skilled in the art that other variations of the present invention will be possible without departing from the scope of the invention disclosed. Furthermore, although the following scenarios are typically described in terms of image or audio data, this is for illustrative purposes only. As aforementioned, the content of a data stream may include images, audio, video, text, and/or the like, and, as such, it is to be understood that the scenarios described hereinafter may be applied to any type of data that may transmitted in a data stream.

Interactive Photograph Contests

In one scenario, the data stream transmission relayed by the data server 102 may contain images provided by recipients of the data stream. Using an uploading utility, a recipient may provide an image along with an identifier, such as his name, email address, or the like. In one example, recipients may upload photographs of themselves and provide their email addresses an identifiers. Typically, as the data server 102 receives the images, a filtering mechanism will screen them for appropriateness for the audience of the data stream. If an image is cleared by the filtering mechanism, it may be added to the data stream transmission. Recipients of the data stream may then view these images as they are displayed. If a recipient sees the image he uploaded, he may select it, thereby initiating a dialogue asking for his identifier. The data server 102 receives the identifier, compares it to the one it has stored for the associated image, and, if they match, the recipient may receive a prize. If necessary, the data server 102 could send a message to be displayed on the recipient's device 104 prompting him to provide necessary contact details. Alternatively, if the identifier itself contains contact details (e.g., an email address) or the recipient has already provided such information (e.g., during service registration), the data server 102 utilize this data to contact him.

In another scenario, images included in the data stream (having been provided by recipients) are voted upon by recipients. For example, when a recipient sees a picture that he likes (or does not like), he may select it and be presented with a dialogue asking him for a rating, which may be a scale (e.g., one to five stars), a positive or negative answer (e.g., "hot" or "not"), or the like. The data server 102 periodically utilizes voting data it has received to determine the image that received the most votes, and thereby determining the winner (i.e., the individual that provided the image). Possible uses of this scenario may be for contests regarding voting for the cutest baby, the best amateur art (painting, photography, etc.) or the like. Once a winner has been established, the transmission may cease, or may continue with newly added data.

Audience Member Locator and Communication Forum

A recipient of a data stream may desire to let other recipients know where he is, was, or will be. For example, a person going out for a night on the town may want to let other recipients know where he will be in case they wish to join him. The person may upload upload his image to the data server 102 and provide a location identifier, such as a Zip Code, city name, establishment name, or the like, in association with it. The specificity of the location identifier may be determined by the recipient. For example, if a recipient so wishes, he may provide a very specific identifier, such as Global Positioning System (GPS) coordinates. The system may be enabled to receive live (or near-to live) location data from the recipient and/or his device 104, and update the data stream content accordingly. Furthermore, the individual may indicate the duration he wants this information to be in the data stream (e.g., how long he will be out on the town). Alternatively, the individual may have previously provided the image and information to the data server 102 and simply activate this data. Once uploaded (or activated), the data server 102 places this information into the data stream transmission. The user's content may only be viewable to recipients within proximity to the user as indicated by his location identifier. A recipient of the data stream may select an image of a person in the data stream to view his location information.

In addition to, or instead of, location information, a user may provide contact information such as a phone number, email address, instant messenger ID, or the like. When recipients select his image, they may be presented with this information. In another scenario, contact information is kept confidential by the data server 102. A recipient desiring to contact another audience member may select the member's image and be presented with a communication interface. The data server 102 may then enable communication between the two members, such as by relaying messages via email or instant messenger, or by connecting the two members via a voice connection. If the data stream is utilized via a voice communication device, such as a mobile phone, the data server 102 may place a call on behalf of the requesting recipient, or the like.

Home Sales Assistant

In another scenario, the present invention may be used by an individual to locate real estate for sale. The user may provide the data server 102 with criteria for real estate he wishes to purchase or monitor. The data server 102 may query its own databases or those of a third party real estate service (e.g., Zillow.com, Realtor.com, etc.) for homes that match that criteria. The data server 102 may then transmit pictures of the matching real estate to the recipient's device 104, enabling him to see pictures of homes that match that criteria as they come onto the market. An alternate version may use hierarchical data that comes through the data stream transmission as the recipient searches, enabling him to refine his search. For example, a data stream transmission may first include a picture of a condominium, a townhouse, and a single-family home. After the recipient selects the picture of a single-family home, the data stream may adjust to display a picture of a ranch-style home and a multi-level home, and so on.

Travel Deal Finder Assistant

A user may provide travel criteria to the data server 102, such as the desired time of departure, destination, and the like. The data server 102 may then transmit a data stream of images associated with various matching travel deals. The user may then select an image to view the particulars of the deal and, if so desired, purchase it. For example, a user may use the data stream transmission to locate a last minute flight.

Interactive Radio Stream

As aforementioned, the data stream sent by the data server 102 may contain audio data, such as songs. All recipients of the data stream may listen to the same songs in real-time or near-to real-time. As the a recipient listens, images associated with the song, such as an album cover, may slide across the display of his device 104. By selecting the image, a recipient may access a dialogue to provide feedback about the song, such as a rating from one to ten. Selecting an image may also enable the user to download the song, purchase the album, or the like. In addition to the current song, the data stream transmission may include a queue indicating upcoming songs. In one scenario, the scrolling of the image may be timed with the duration of the song so that the image completes its travel across the display of device 104 when the song ends. When the song ends, the next song plays and the next image begins to scroll across the display. In addition to voting on the current song, recipients may vote on the songs in the queue. A song receiving a certain number of votes may be added to those that will be played. For example, the top five songs listed in the queue may have received enough votes for broadcast, while the next five are open to voting. Recipients may be presented with the option to vote positively, negatively, or both. If a song receives a certain number of negative votes, it may be removed from the queue. Once a song is removed from the queue, either by being played or voted off the queue, another song (and its associated image) may enter the queue. In one scenario, the last slot in a queue is open to submission by recipients. Whether the song is added to the queue may be determined by various parameters, such as the submitting user being the first to submit a song request.

Deal Transmission

In one scenario, the data stream transmission may include content pertaining to sales, deals, promotions, and the like for various products. The types of products include in the data stream could be determined by the recipient, such as per established preferences or per interactions with the data stream. The recipient may select an item presented in the data stream, such as by clicking it with his mouse, and the product may be added to an electronic shopping cart. Furthermore, the most popular items selected by recipients of the data stream could be presented in a second data stream displaying "hot deals" for the day.

In another scenario, members of an online community, such as a Facebook network, may share their favorite goods or services (e.g., music albums, books, clothing, handbags, etc.) via the data stream. For example, a participating user may indicate a favorite good or service (e.g., a book title) to the data server 102. The data server 102 may then retrieve associated content (e.g., a book jacket image) from its content data store 202 or from a content source 108 (e.g., from the World Wide Web). The data server 102 may then adjust the data stream to include the associated content (e.g., an image of the book jacket). When a recipient of the data stream selects an element of the data stream, he may be enabled to purchase it. For example, when a recipient viewing a data stream of book jacket images clicks an image, he may be presented with a web page allowing him to purchase the book represented by the book jacket image. Suppliers of goods or services may bid to be the provider of the good or service. The data server 102 may select the supplier based upon one or more criteria. For example, the data server 102 may select the supplier that offers the good or service for the lowest price or the supplier that provides the most commission to the operator of the data server 102. The data server 102 may present the selected supplier via a web interface as the "Featured Supplier," and may allow the recipient to either choose the "Featured Supplier" or choose another supplier (e.g, via a "Go Shopping" option), such as via a web searching mechanism (e.g., Google Product Search, PriceGrabber.com, etc.).

Advertising

In one scenario, a data stream transmission can include advertising intermixed with the content of the transmission itself or placed in a header, footer, border, or the like connected to the contents of the data stream. Empty advertising space may be displayed during the data stream transmission. A recipient desiring to add advertising to the data stream may select this empty space (e.g., a image slot saying "Space for Rent") and be presented with a prompt enabling him to add advertising data.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention. Therefore, the description should not be considered to be exclusive of these other embodiments. Also, it is to be understood that the phraseology and terminology employed herein are for the purposes of description and should not be regarded as limiting.

That which is claimed:

1. An apparatus comprising:
 a device configured to receive a data stream including content data from a data server, the data server being configured to simultaneously provide the same data stream to one or more other devices for presentation of the same content data by the respective one or more other devices, the content data including audio data for a currently-played song and a plurality of visual elements including image data for the currently-played song and one or more upcoming songs in a queue of songs,
 wherein the device is configured to present the content data of the data stream to a user, including being configured to scroll or slide the visual elements arranged in a position on a screen, the image data for the one or more upcoming songs being arranged on the screen in an order the data server is configured to add the respective one or more upcoming songs to the content data to thereby play the respective one or more upcoming songs,
 wherein the device is configured to receive an indication of user interaction with the content data of the data stream, the indication including a vote for or against an upcoming song in the queue of songs,
 wherein the device is configured to transmit data associated with the user interaction and including the vote, the data server being configured to adjust the content data of the data stream per the user interaction, including the data server being configured to adjust the content data to reorder the image data for the respective upcoming song in the queue of songs or remove the image data for the respective upcoming song in the queue of songs based on the vote from the device and a vote for or against the respective upcoming song from any of the one or more other devices, and wherein the device being configured to receive the data stream includes being configured to receive the data stream further including the adjusted content data, and being configured to present the content data includes being configured to further present the adjusted content data, the data server being configured to simultaneously provide the same data stream to the one or more other devices for further presentation of the same adjusted content data by the respective one or more other devices.

2. The apparatus of claim 1, wherein the device is one of a computer or a mobile device.

3. The apparatus of claim 1, wherein the content data further includes one or more of textual data or video data.

4. The apparatus of claim 1, wherein the device is configured to receive an indication of a further user interaction including one or more of image data, textual data, video data or audio data.

5. The apparatus of claim 1, wherein the device is configured to receive an indication of a further user interaction including input regarding one or more songs of one or more of the currently-played song or one or more upcoming songs.

6. The apparatus of claim 1, wherein the device is configured to receive an indication of a further user interaction including a request for further information regarding one or more songs of one or more of the currently-played song or one or more upcoming songs.

7. The apparatus of claim 1, wherein the device is configured to receive an indication of a further user interaction including a request to purchase a good or service associated with one or more songs of one or more of the currently-played song or one or more upcoming songs.

8. The apparatus of claim 1, wherein the device is configured to receive an indication of a further user interaction including selection of a visual element different from the visual elements of the content data, the selected visual element including one or more of image data or video data, wherein the device is configured to transmit data associated with the further user interaction, including being configured to upload the selected visual element, the data server being configured to further adjust the content data of the data stream to add the selected, uploaded visual element to the content data, the further adjusted content data including the uploaded, added visual element.

9. The apparatus of claim 8, wherein the device being configured to receive the indication of the further user interaction includes being configured to further receive a location identifier reflecting a geographic location or contact information for the user, wherein the device being configured to transmit data associated with the further user interaction includes being configured to upload the selected visual element and location identifier or contact information, the data server thereby being configured to adjust the content data of the data stream to add the selected, uploaded visual element and location identifier or contact information to the content data, the adjusted content data including the uploaded, added visual element and location identifier or contact information.

10. The apparatus of claim 1, wherein the device is configured to receive an indication of a further user interaction including a location identifier reflecting a geographic location or contact the information for the user, wherein the device is configured to transmit data associated with the further user interaction including the location identifier or contact information, the data server being configured to further adjust the content data of the data stream to add the location identifier or contact information to the content data, the further adjusted content data including the added location identifier or contact information.

11. The apparatus of claim 1, wherein the content data of the data stream includes information for a plurality of goods or services available for purchase that are associated with one or more songs of one or more of the currently-played song or one or more upcoming songs, wherein the device is configured to receive the indication of user interaction, the indication including selection of one of the goods or services, and wherein the device being configured to transmit data associated with the user interaction includes being configured to transmit the selection, the data server thereby being configured to adjust the content data to add a second data stream to include the selected good or service and any other of the goods or services for which the data server receives selection from a predetermined number of the device and the one or more other devices, the second data stream thereby including goods or services designated as being popular goods or services.

12. The apparatus of claim 1, wherein the visual elements of the content data include empty advertising space interspersed with other visual elements, wherein the device is configured to receive an indication of a further user interaction including selection of the empty advertising space, wherein the device is configured to transmit data associated with the further user interaction including an indication of selection of the empty advertising space, the data server thereby being configured to cause the device to present a prompt to permit the user to input advertising data, and wherein the device is further configured to receive the advertising data, and transmit the advertising data, the data server thereby being configured to adjust the content data of the data stream to add the advertising data to the content data, the adjusted content data including the added advertising data.

13. An apparatus comprising:

a data server configured to simultaneously provide a data stream including content data to a plurality of devices for presentation of the content data of the data stream to respective users of the devices, the content data including audio data for a currently-played song and a plurality of visual elements including image data for the currently-played song and one or more upcoming songs in a queue of songs, wherein the data server is configured to provide the data stream for the devices to scroll or slide the visual elements arranged in a position on respective screens, the image data for the one or more upcoming songs being arranged on the respective screens in an order the data server is configured to add the respective one or more upcoming songs to the content data to thereby play the respective one or more upcoming songs, wherein data server is configured to receive from one of the devices, data associated with a user interaction with the content data of the data stream, the indication including a vote for or against an upcoming song in the queue of songs, wherein the data server is configured to adjust the content data of the data stream per the user interaction, including being configured to adjust the content data to reorder the image data for the respective upcoming song in the queue of songs or remove the image data for the respective upcoming song in the queue of songs based on the vote from the one of the devices and a vote for or against the respective upcoming song from any other of the devices, and wherein the data server being configured to provide the data stream further includes being configured to simultaneously provide the data stream further including the adjusted content data to the plurality of devices for further presentation of the adjusted content of the data stream to the users of the respective devices.

14. The apparatus of claim 13, wherein the content data further includes one or more of textual data or video data.

15. The apparatus of claim 13, wherein the data server is configured to receive data associated with a further user interaction including one or more of image data, textual data, video data or audio data.

16. The apparatus of claim 13, wherein the data server is configured to receive data associated with a further user interaction including input regarding one or more songs of one or more of the currently-played song or one or more upcoming songs.

17. The apparatus of claim 13, wherein the data server is configured to receive data associated with a further user interaction including a request for further information regarding one or more songs of one or more of the currently-played song or one or more upcoming songs.

18. The apparatus of claim 13, wherein the data server is configured to receive data associated with a further user interaction including a request to purchase a good or service associated with one or more songs of one or more of the currently-played song or one or more upcoming songs.

19. The apparatus of claim 13, wherein data server is configured to receive data associated with a further user interaction including an uploaded visual element different from the visual elements of the content data, the uploaded visual element including one or more of image data or video data, wherein the data server is configured to further adjust the content data including being configured to add the uploaded visual element to the content data, the further adjusted content data including the uploaded, added visual element.

20. The apparatus of claim 13, wherein the data server is configured to receive data associated with a further user interaction including a location identifier reflecting a geographic location or contact information for the user, and wherein the data server is configured to further adjust the content data including being configured to add the location identifier or contact information to the content data, the further adjusted content data including the added location identifier or contact information.

21. The apparatus of claim 20, wherein the data server being configured to further adjust the content data includes being configured to add previously-uploaded image data with the location identifier or contact information, the further adjusted content data including the added, previously-uploaded image data and location identifier or contact information.

22. A non-transitory computer-readable storage medium having computer-readable program code portions stored therein, the computer-readable storage medium and computer-readable program code portions being configured to, with a processor, cause an apparatus to at least:

receive a data stream including content data from a data server, the data server being configured to simultaneously provide the same data stream to one or more other devices for presentation of the same content data by the respective one or more other devices, the content data including audio data for a currently-played song and a plurality of visual elements including image data for the currently-played song and one or more upcoming songs in a queue of songs;

direct presentation of the content data of the data stream to a user, including being configured to cause the apparatus to scroll or slide the visual elements arranged in a position on a screen, the image data for the one or more upcoming songs being arranged on the screen in an order the data server is configured to add the respective one or more upcoming songs to the content data to thereby play the respective one or more upcoming songs;

receive an indication of user interaction with the content data of the data stream, the indication including a vote for or against an upcoming song in the queue of songs; and direct transmission of data associated with the user interaction and including the vote, the data server being configured to adjust the content data of the data stream per the user interaction, including the data server being configured to adjust the content data to reorder the image data for the respective upcoming song in the queue of songs or remove the image data for the respective upcoming song in the queue of songs based on the vote from the device and a vote for or against the respective upcoming song from any of the one or more other devices, wherein being configured to cause the apparatus to receive the data stream includes being configured to cause the apparatus to receive the data stream further including the adjusted content data, and being configured to cause the apparatus to direct presentation of the content data includes being configured to cause the apparatus to further direct presentation of the adjusted content data, the data server being configured to simultaneously provide the same data stream to the one or more other devices for further presentation of the same adjusted content data by the respective one or more other devices.

23. The non-transitory computer-readable storage medium of claim 22, wherein the content data further includes one or more of textual data or video data.

24. The non-transitory computer-readable storage medium of claim 22, wherein the apparatus is caused to receive an indication of a further user interaction including one or more of image data, textual data, video data or audio data.

25. The non-transitory computer-readable storage medium of claim 22, wherein the apparatus is caused to receive an indication of a further user interaction, including input regarding one or more songs of one or more of the currently-played song or one or more upcoming songs.

26. The non-transitory computer-readable storage medium of claim 22, wherein the apparatus is caused to receive an indication of a further user interaction including a request for further information regarding one or more songs of one or more of the currently-played song or one or more upcoming songs.

27. The non-transitory computer-readable storage medium of claim 22, wherein the apparatus is caused to receive an indication of a further user interaction including a request to purchase a good or service associated with one or more songs of one or more of the currently-played song or one or more upcoming songs.

28. The non-transitory computer-readable storage medium of claim 22, wherein the apparatus is caused to receive an indication of a further user interaction including selection of a visual element different from the visual elements of the content data, the selected visual element including one or more of image data or video data,
- wherein being configured to cause the apparatus to direct transmission of data associated with the further user interaction includes being configured to cause the apparatus to direct an upload of the selected visual element, the data server being configured to further adjust the content data of the data stream to add the selected, uploaded visual element of the content data, the further adjusted content data including the uploaded, added visual element.

29. A non-transitory computer-readable storage medium having computer-readable program code portions stored therein, the computer-readable storage medium and computer-readable program code portions being configured to, with a processor, cause an apparatus to at least:
- direct simultaneous provision of a data stream including content data to a plurality of devices for presentation of the content data of the data stream to respective users of the devices, the content data including audio data for a currently-played song and a plurality of visual elements including image data for the currently-played song and one or more upcoming songs in a queue of songs,
- wherein the apparatus is caused to direct provision of the data stream for the devices to scroll or slide the visual elements arranged in a position on respective screens, the image data for the one or more upcoming songs being arranged on the respective screens in an order the data server is configured to add the respective one or more upcoming songs to the content data to thereby play the respective one or more upcoming songs;
- receive from one of the devices, data associated with a user interaction with the content data of the data stream, the indication including a vote for or against an upcoming song in the queue of songs; and
- adjust the content data of the data stream per the user interaction, including the apparatus being caused to adjust the content data to reorder the image data for the respective upcoming song in the queue of songs or remove the image data for the respective upcoming song in the queue of songs based on the vote from the one of the devices and a vote for or against the respective upcoming song from any other of the devices,
- wherein being configured to cause the apparatus to direct provision of the data stream further includes being configured to cause the apparatus to direct simultaneous provision of the data stream further including the adjusted content data to the plurality of devices for further presentation of the adjusted content of the data stream to the users of the respective devices.

30. The non-transitory computer-readable storage medium of claim 29, wherein the content data further includes one or more of textual data or video data.

31. The non-transitory computer-readable storage medium of claim 29, wherein the apparatus is caused to receive data associated with a further user interaction including one or more of image data, textual data, video data or audio data.

32. The non-transitory computer-readable storage medium of claim 29, wherein the apparatus is caused to receive data associated with a further user interaction including input regarding one or more songs of one or more of the currently-played song or one or more upcoming songs.

33. The non-transitory computer-readable storage medium of claim 29, wherein the apparatus is caused to receive data associated with a further user interaction including a request for further information regarding one or more songs of one or more of the currently-played song or one or more upcoming songs.

34. The non-transitory computer-readable storage medium of claim 29, wherein the apparatus is caused to receive data associated with a further user interaction including a request to purchase a good or service associated with one or more songs of one or more of the currently-played song or one or more upcoming songs.

35. The non-transitory computer-readable storage medium of claim 29, wherein the apparatus is caused to receive data associated with a further user interaction including an uploaded visual element different from the visual elements of the content data, the uploaded visual element including one or more of image data or video data,
- wherein the apparatus is caused to further adjust the content data including the apparatus being caused to add the uploaded visual element to the content data, the further adjusted content data including the uploaded, added visual element.

* * * * *

UNITED STATES PATENT AND TRADEMARK OFFICE
CERTIFICATE OF CORRECTION

PATENT NO. : 8,683,068 B2  Page 1 of 1
APPLICATION NO. : 12/190581
DATED : March 25, 2014
INVENTOR(S) : Jalili et al.

It is certified that error appears in the above-identified patent and that said Letters Patent is hereby corrected as shown below:

Title page 1, (75) Inventors section, "Gregory J. Clary, Cary, UT (US)" should read --Gregory J. Clary, Cary, NC (US)--

Signed and Sealed this
Second Day of June, 2015

Michelle K. Lee
*Director of the United States Patent and Trademark Office*